(12) United States Patent
Friedman et al.

(10) Patent No.: US 7,801,571 B2  
(45) Date of Patent: Sep. 21, 2010

(54) MULTI-USE ACOUSTIC LEAK PATH SYSTEM

(75) Inventors: Joseph M. Friedman, Plantation, FL (US); David I. Blatt, Margate, FL (US); Chun L. Chong, Penang (MY); Shlomo Gelbart, Plantation, FL (US); Karl F. Mueller, Sunrise, FL (US); Eric S. Penrod, Sunrise, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 739 days.

(21) Appl. No.: 11/289,909

(22) Filed: Nov. 30, 2005

(65) Prior Publication Data

US 2007/0123312 A1 May 31, 2007

(51) Int. Cl.  
*H04M 1/00* (2006.01)  
*H04R 25/00* (2006.01)

(52) U.S. Cl. ............... 455/569.1; 379/433.2; 381/184

(58) Field of Classification Search ............... 179/182; 381/183, 371; 455/90, 569, 334; 411/339; 379/433.02; 73/40.7  
See application file for complete search history.

(56) References Cited

U.S. PATENT DOCUMENTS

| | | | | | |
|---|---|---|---|---|---|
| 4,239,945 | A | * | 12/1980 | Atoji et al. | 381/371 |
| 5,420,935 | A | * | 5/1995 | Shinohara et al. | 381/370 |
| 6,002,949 | A | * | 12/1999 | Hawker et al. | 455/569.1 |
| 6,134,336 | A | | 10/2000 | Clark | |
| 2003/0148742 | A1 | * | 8/2003 | Kim | 455/90 |
| 2004/0170291 | A1 | * | 9/2004 | Eaton | 381/334 |

* cited by examiner

*Primary Examiner*—Charles N Appiah  
*Assistant Examiner*—Kiet Doan  
(74) *Attorney, Agent, or Firm*—Larry G. Brown; Sylvia Chen

(57) ABSTRACT

The invention concerns a mobile communications unit (100) having at least one transducer (120) that can broadcast audio through a direct port (110), at least one leak port (114) for leak tolerance of the unit, in which the leak port can have a first opening (116) and a multi-use opening (118). The multi-use opening can be coupled to the first opening of the leak port to complete a path for the leak port, and the multi-use opening can also receive a part of an accessory. As an example, the mobile unit can be a monolith mobile unit. As another example, the accessory can be a holster having a hook mechanism that fits within the multi-use opening and can secure the mobile communications unit to the holster.

13 Claims, 3 Drawing Sheets

MULTI-USE ACOUSTIC LEAK PATH SYSTEM

BACKGROUND OF THE INVENTION

1. Field of the Invention

The present invention concerns acoustics in a wireless device and more particularly, acoustic leak paths in such a device.

2. Description of the Related Art

Almost all mobile communications units include acoustic transducers for broadcasting audio. As is known in the art, such a transducer typically broadcasts audio through a direct port, which leads to the outside of the mobile unit. In addition, for proper operation of the transducer, a back volume is provided in the mobile unit on the other side of the transducer. Normally, a user will hold the mobile unit up against his or her ear, which may provide a seal between the user's head and the mobile unit. In this scenario, the frequency response of the acoustic output for the relevant frequencies is optimal.

There are times, however, when the user may position the mobile unit such that this seal is compromised. For example, the user may move the mobile unit away from his or her head. In this case, there may be a loss in amplitude of the lower end frequencies of the acoustic output, which will lead to an inconsistent acoustic experience for the user. To overcome this issue, many mobile units include leak ports. A leak port is a port that is typically positioned near the direct port of the mobile unit and runs through the mobile unit and exits out the back of the unit. The leak port can help prevent a seal from forming between the user's ear and the mobile unit. Although such a design may result in a less-than-optimal frequency response, as compared to a seal being formed as described above, it does lead to a more consistent acoustic experience for the user if the user re-positions the mobile unit while in use.

Some mobile units may include both low audio and high audio transducers. The low audio transducer is typically used for interconnect calls, while the high audio is generally reserved for dispatch communications. In this type of mobile unit, the low audio transducer must be sealed off from the rest of the mobile unit to prevent audio from the high audio transducer from leaking out of the direct port of the low audio transducer. As such, leak ports are constrained as to where they may be positioned, as they too must be isolated from the high audio transducer. In addition, leak ports typically reduce the aesthetic appearance of the mobile unit, and they make the mobile unit more susceptible to contaminants entering the unit.

SUMMARY OF THE INVENTION

The present invention concerns a mobile communications unit that can include at least one transducer that can broadcast audio through a direct port, at least one leak port for leak tolerance of the mobile communications unit in which the leak port can have a first opening, and a multi-use opening. In one arrangement, the multi-use opening can be coupled to the first opening of the leak port to complete a path for the leak port, and the multi-use opening can also receive a part of an accessory. As an example, the mobile communications unit can be a monolith mobile communications unit.

In another arrangement, the direct port can exit through a first surface of the mobile communications unit, and the first opening of the leak port can be positioned on the first surface. As another example, the accessory can be a holster having a hook mechanism that can fit within the multi-use opening and can secure the mobile communications unit to the holster.

The mobile communications unit can also have a high audio area within the unit, and the transducer may include a seal that can help at least substantially isolate the transducer from the high audio area. In addition, the leak port can be at least substantially isolated from the high audio area, and the seal can be positioned against a printed circuit board. As another example, the transducer can be a low audio transducer.

The present invention also concerns a mobile communications unit that can include at least one transducer that can broadcast audio through a direct port, at least one leak port for leak tolerance of the system in which the leak port can have a first opening and a second opening, and an accessory opening that can receive a part of an accessory. The accessory opening and the second opening may be integrated to form a single opening in the mobile communications unit.

In one arrangement, the mobile communications unit can have a high audio dispatch area and a transducer within the unit. The transducer can include a seal that can help at least substantially isolate the transducer from the high audio dispatch area. In addition, the leak port can at least be substantially isolated from the high audio dispatch area. As an example, the transducer can be a low audio transducer that broadcasts audio from interconnect calls.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

Figure 1:
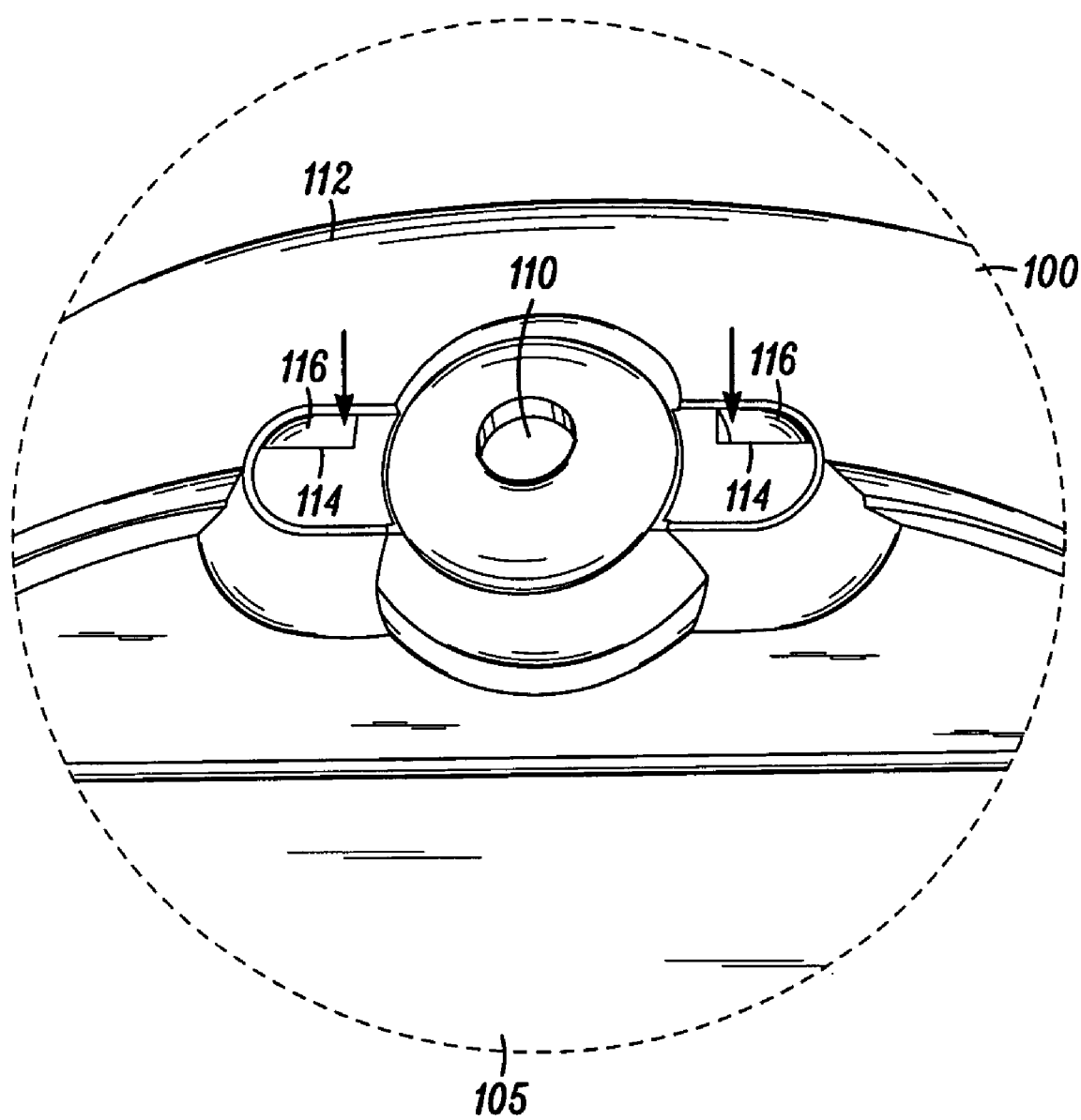
FIG. 1 illustrates a front view of a portion of a mobile communications unit in accordance with an embodiment of the inventive arrangements.

While the specification concludes with claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "plurality," as used herein, is defined as two or more than two. The term "another," as used herein, is defined as at least a second or more. The terms "including"

and/or "having," as used herein, are defined as comprising (i.e., open language). The term "coupled," as used herein, are defined as connected, although not necessarily directly, and not necessarily mechanically.

The present invention concerns a mobile communications unit having at least one transducer that can broadcast audio through a direct port, at least one leak port for leak tolerance of the unit, in which the leak port can have a first opening, and a multi-use opening. The multi-use opening can be coupled to the first opening of the leak port to complete a path for the leak port, and the multi-use opening can also receive a part of an accessory. As an example, the mobile unit can be a monolith mobile unit. As another example, the accessory can be a holster having a hook mechanism that can fit within the multi-use opening and can secure the mobile communications unit to the holster.

As such, the invention can reduce the number of unsightly openings in a mobile unit while at the same time can maintain the acoustic characteristics of a leak port system. The use of the multi-use opening may also lessen the chances that contaminants may enter the mobile unit. In addition, if the mobile unit contains a high audio transducer, the isolation between the high audio area and the leak port can be preserved.

Referring to FIG. 1, a portion of a mobile communications unit 100 is shown. As an example, the unit 100 may be a monolith mobile communications unit 100. A monolith mobile communications unit can be defined as a mobile unit in which the unit is contained within a single integrated housing. Of course, the invention is not so limited, as the unit 100 can be any other suitable unit or system.

In one arrangement, the mobile unit 100 can have a display 105, one or more direct ports 110 and one or more transducers (not shown here) that can broadcast audio through the direct port 110. The direct port 110 can exit the mobile unit 100 through a first surface 112 of the mobile unit 100. In addition, the mobile unit 100 can also include one or more leak ports 114 for leak tolerance in the mobile unit 100. As is known in the art, the leak ports 114 can help prevent a seal from forming between a user's ear and the mobile unit 100 to produce a more consistent acoustic experience for the user. In this example, the leak ports 114 can have a first opening 116 that can be positioned on the first surface 112 of the mobile unit 100.

Figure 2:
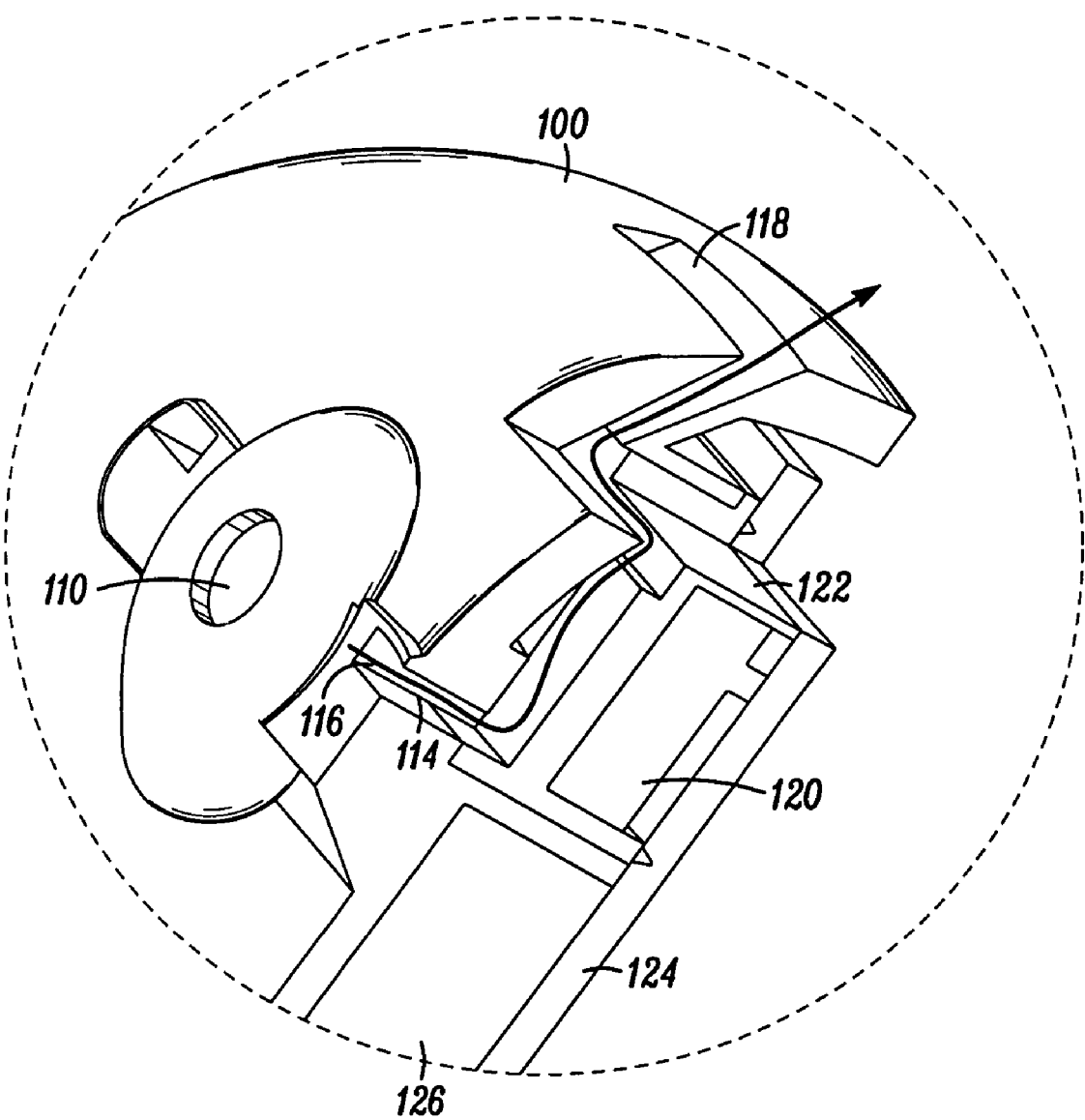
FIG. 2 illustrates a perspective, cross-sectional view of a mobile communications unit in accordance with an embodiment of the inventive arrangements.
Figure 3:
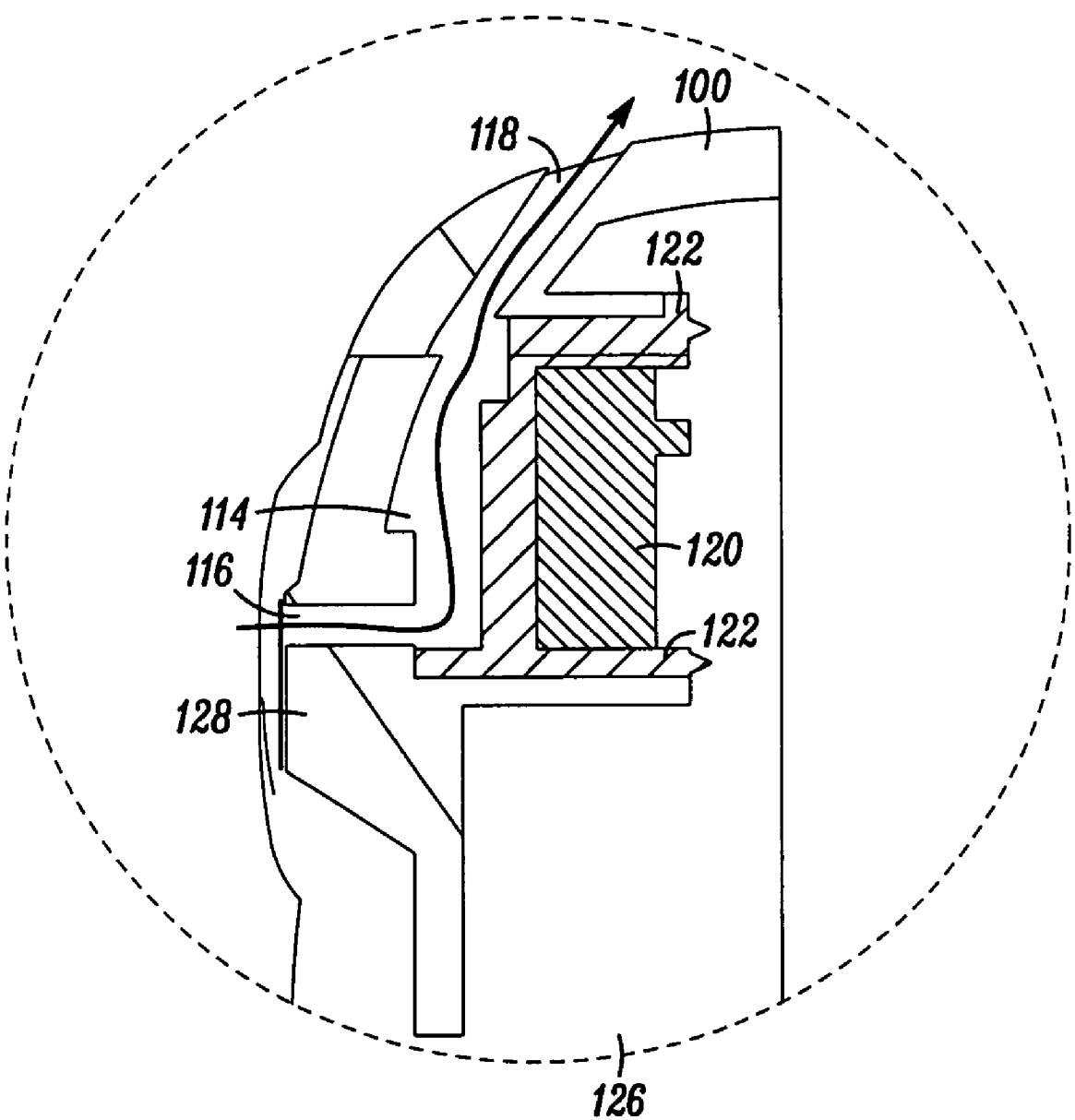
FIG. 3 illustrates another cross-sectional view of a mobile communications unit in accordance with an embodiment of the inventive arrangements.

Referring to FIGS. 2 and 3, perspective and side cross-sectional views of the mobile unit 100 are shown. In one arrangement, the mobile unit 100 can include a multi-use opening 118, which can be coupled to the first opening 116 of the leak port 114 to complete a path for the leak port 114. The arrows in FIGS. 2 and 3 designate one example of this path for the leak port 114. As can be seen, the multi-use opening 118 can be considered a second opening of the leak port 114 because it can open to the outside environment of the mobile unit 100. In another arrangement, the multi-use opening 118 can also receive a part of an accessory (not shown). In other words, the multi-use opening 118 can also be considered an accessory opening that receives a part of an accessory. As such, the accessory opening and the second opening can be integrated to form a single opening in the mobile communications unit 100.

As an example, the accessory can be a holster (not shown) having a hook mechanism that can fit within the multi-use opening 118 and can secure the mobile communications unit 110 to the holster. Those of skill in the art will appreciate that the multi-use opening 118 can be configured to permit it to receive the accessory (e.g., holster) without interfering with the operation of the leak port 114. It must be noted that the accessory is not limited to a holster, as the accessory can be any other suitable component. In fact, the term accessory can refer to any component that may engage the mobile communication unit 100 to enhance the operation of the unit 100 in any suitable way.

In one particular arrangement, the mobile unit 100 may include a low audio transducer 120, which, as an example, can broadcast audio from an interconnect call. The term low audio transducer can be any transducer intended to broadcast audio at a level that is considered safe enough to permit a user to place his or her ear against a device that houses the low audio transducer. Of course, the transducer 120 is not limited to a low audio transducer and is not limited to broadcasting audio from an interconnect call. For example, the transducer 120 can broadcast audio from a dispatch call (or any other suitable type of audio), if so desired.

The transducer 120 may include a seal 122, which can be positioned against a printed circuit board (PCB) 124 (best seen in FIG. 2) of the mobile unit 100. As an example, the mobile unit 100 may also include a high audio area 126. In particular, the high audio area 126 may house a high audio transducer (not shown). For purposes of the invention, the term high audio area can refer to an area that can house a transducer that can broadcast audio at a level that is considered unsafe for a user to position his or her ear against a housing in which the high audio area is situated. As an example, the transducer in the high audio area 126 can broadcast audio from a dispatch call. Here, the seal 122, when positioned against the PCB 124, can help isolate the transducer 120 from the high audio area 126. As can be best seen in FIG. 3, the seal 122, in combination with a portion of a housing 128 of the mobile unit 100, can isolate the leak port 114 from the high audio area 126. It is understood, however, that the transducer in the high audio area is not necessarily limited to broadcasting audio from a dispatch call, as it can broadcast any other suitable type of audio.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A mobile communications unit, comprising:
   at least one transducer that broadcasts audio through a direct port;
   at least one leak port for leak tolerance of the mobile communications unit, wherein the leak port has a first opening and helps prevent a seal from forming between a user's ear and the mobile communications unit; and
   a multi-use opening, wherein the multi-use opening is coupled to the first Opening of the leak port to complete a path for the leak port and wherein the multi-use Opening also receives a part of an accessory,
   wherein the direct port exits through a first surface of the mobile communications unit and wherein the first opening of the leak port is positioned on the first surface.

2. The unit according to claim 1, wherein the mobile communications unit is a monolith mobile communications unit.

3. The unit according to claim 1, wherein the accessory is a holster having a hook mechanism that fits within the multi-use opening and secures the mobile communications unit to the holster.

4. The unit according to claim 1, wherein the mobile communications unit has a high audio area within the unit and wherein the transducer includes a seal that helps at least substantially isolate the transducer from the high audio area.

5. The unit according to claim 4, wherein the leak port is at least substantially isolated from the high audio area.

6. The unit according to claim 4, wherein the seal is positioned against a printed circuit board.

7. The unit according to claim 1, wherein the transducer is a low audio transducer.

8. A mobile communications unit, comprising:
- at least one transducer that broadcasts audio through a direct port;
- at least one leak port for leak tolerance of the system, wherein the leak port has a first opening and a second opening and helps prevent a seal from forming between a user's ear and the mobile communications unit; and
- an accessory opening that receives a part of an accessory, wherein the accessory opening and the second opening are integrated to form a single opening in the mobile communications unit,
- wherein the direct port exits through a first surface of the mobile communications unit and wherein the first opening of the leak port is positioned on the first surface.

9. The unit according to claim 8, wherein the mobile communications unit is a monolith mobile communications unit.

10. The unit according to claim 8, wherein the accessory is a holster having a hook mechanism that fits within the accessory opening and secures the mobile communications unit to the holster.

11. The unit according to claim 8, wherein the mobile communications unit has a high audio dispatch area within the unit and wherein the transducer includes a seal that helps at least substantially isolate the transducer from the high audio dispatch area.

12. The unit according to claim 11, wherein the leak port is at least substantially isolated from the high audio dispatch area.

13. The unit according to claim 8, wherein the transducer is a low audio transducer that broadcasts audio from interconnect calls.

* * * * *